(12) United States Patent
Flora et al.

(10) Patent No.: US 8,672,549 B2
(45) Date of Patent: Mar. 18, 2014

(54) KEYLESS/GROOVELESS FOIL BEARING WITH FOLD OVER TAB

(71) Applicant: GM Global Technology Operations LLC, Detroit, MI (US)

(72) Inventors: Brian S. Flora, Commerce Township, MI (US); Steven L. Clark, Farmersville, IL (US); Jon R. Sienkowski, Rochester, NY (US); Stephan M. Ruchenewitz, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/789,725

(22) Filed: Mar. 8, 2013

(65) Prior Publication Data

US 2013/0216167 A1  Aug. 22, 2013

Related U.S. Application Data

(62) Division of application No. 12/727,709, filed on Mar. 19, 2010, now Pat. No. 8,414,191.

(51) Int. Cl.
*F16C 33/06* (2006.01)

(52) U.S. Cl.
USPC .................... 384/103; 384/104; 384/106

(58) Field of Classification Search
USPC .......... 384/103, 104, 106; 403/270, 271, 272, 403/360, 365
See application file for complete search history.

(56) References Cited

U.S. PATENT DOCUMENTS

| | | | |
|---|---|---|---|
| 5,658,079 A | 8/1997 | Struziak et al. | |
| 6,811,315 B2 | 11/2004 | Fournier et al. | |
| 7,614,792 B2 * | 11/2009 | Wade et al. | 384/104 |
| 8,029,194 B2 * | 10/2011 | Agrawal et al. | 384/106 |
| 2002/0097927 A1 | 7/2002 | Lee et al. | |
| 2006/0183074 A1 | 8/2006 | Brennan | |
| 2008/0310778 A1 | 12/2008 | Lee et al. | |

* cited by examiner

*Primary Examiner* — Marcus Charles
*Assistant Examiner* — Adam D Rogers
(74) *Attorney, Agent, or Firm* — Fraser Clemens Martin & Miller LLC; J. Douglas Miller

(57) ABSTRACT

An improved air foil bearing assembly is disclosed. The air foil bearing assembly includes a bearing housing having an axially extending bore therein and a shaft arranged within the bore for relative coaxial rotation with respect to the bearing housing. The shaft cooperates with the bearing housing to define an annular gap therebetween. A foil assembly is disposed in the annular gap, including at least one foil having at least one laterally extending tab. The tab is adapted to be received in and extend axially from the annular gap and is further adapted to be bent into frictional contact with an outer surface of the bearing housing to militate against axial movement of the foil.

16 Claims, 3 Drawing Sheets

KEYLESS/GROOVELESS FOIL BEARING WITH FOLD OVER TAB

CROSS-REFERENCE TO RELATED APPLICATIONS

This application is a divisional of U.S. patent application Ser. No. 12/727,709, filed on Mar. 19, 2010. The entire disclosure of the above application is incorporated herein by reference.

FIELD OF THE INVENTION

The invention relates to foil air bearings supporting a rotating shaft of a variety of high-speed rotating systems.

BACKGROUND OF THE INVENTION

Foil air bearings are known for use with high-speed air rotating shafts, A machine with foil air bearings is more reliable than one with rolling element bearings because it requires fewer parts to support the rotating assembly and needs no lubrication. In operation, an air/gas film between a bearing and a rotating shaft protects the foil bearing itself from wear. The bearing surface is in contact with the shaft only when the machine starts and stops, and a coating on the foils limits wear at those times.

The principle of an air bearing, whether of the journal or thrust type, is simple. When two surfaces form a wedge and one surface moves relative to the other, pressure is generated between the surfaces due to the hydrodynamic action of the fluid carrying the load. In a journal bearing, the shaft deflects and a wedge is formed due to the eccentricity between the shaft center and the bearing center.

Even though the principle of an air bearing is simple, application is complex. For instance, in a normal journal bearing assembly, the running radial clearance between the shaft and bearing is extremely small (typically less than 0.0005 inch for a 2-inch-diameter shaft at 36,000 rpm, for example), Any eccentricity in the shaft, or friction within the bearings, may cause shaft deflection and/or shaft thermal expansion that could exceed the running clearance, thereby reducing the useful life of the bearing assembly. In addition, damping is required to suppress any whirl instability, and there can be misalignment between various rotating and stationary parts within the assembly.

Foil bearings address these problems. While the shaft is stationary, there is a small amount of preload between the shaft and the foil bearing. As the shaft turns, hydrodynamic pressure is generated between the shaft and the bearing foils, pushing the foils away from the shaft and making the shaft completely airborne. This phenomenon occurs nearly instantly during start-up, and at a very low speed. When the shaft is airborne, the friction loss due to shaft rotation is extremely small. As the shaft expands or deflects, the foils get pushed farther away, keeping an air film clearance relatively constant. In addition, the foils provide coulomb damping due to frictional contact therebetween, which enhances the rotational stability.

An exemplary air foil bearing assembly 20 is shown partially exploded in FIG. 1. The bearing assembly 20 contains a thin layer of top foil 22 supported on a corrugated or "bump" foil 24. The bump foil 24 is arranged on the inner circumferential surface 26 of the bearing housing 28, and the top foils 22 is inserted on the inner annular surface 30 of the bump foil 24. At least an inner annular surface 32 of the top foil 22 is typically coated with a solid film lubricant to provide low contact friction between a rotating shaft (not shown) and the inner annular surface 32 of the top foil 22.

The bump foil inner annular surface 30 is in frictional contact with an outer annular surface 34 of the top foil 22, providing support to the top foil 22. The corrugations 36 of the bump foil 24, as well as the thickness of the bump foil 24, are designed to provide a desired stiffness, and spring force between the bearing housing inner circumferential surface 26 and the top foil 22 to provide the desired bearing load support capacity. Typically, a small amount of preload is desired between the shaft (not shown) and the inner annular surface 32 of the top foil 22 when the shaft is at rest. During shaft rotation, air is drawn between the shaft and the top foil inner annular surface 32, where it is compressed. Due to hydrodynamic action, the compressed air deflects the top foil 22 away from the shaft and the shaft is supported by a cushion of air. As the top foil 22 deflects radially outwardly, it is supported by the corrugations 36 of the bump foil 24. Depending upon the magnitude of the hydrodynamic forces, the corrugations 36 elastically deform, thereby providing a compliant feature of the bearing assembly 20. In particular, the pre-determined spring rate of the bump foil 24 accommodates shaft expansion, shaft excursion and housing misalignment. The corrugations 36 also provide a flow path for a small amount of cooling air, thereby maintaining a desired temperature in the bearing assembly 20.

Typically, both the top foil 22 and the bump foil 24 are separately stamped from sheet metal having a desired thickness. The bumps 36 may be formed in the bump foil 24 as part of the stamping process, or they may be formed in a second stamping or rolling operation. The ends 40 of the top foil 22 are formed with a ninety degree flange that is affixed to a metallic key 42, usually by a spot welding or other bonding operation. Similarly, the ends 44 of the bump foil 24 are each formed with a ninety degree flange, and are affixed to the metallic key 42 by a spot welding or other bonding operation, wherein the bump foil is located between the top foil 22 and the inner circumferential surface 26 of the bearing housing 28 when assembled into the housing 28 (FIG. 2). The key 42, including the ends 40, 44 respectively of the top foil 22 and the bump foil 24, is then inserted into a machined keyway 46 formed in the bearing housing 28. Insertion of the key 42 into the keyway 46 prevents rotational movement of the top foil 22 and the bump foil 24, which is crucial to proper air bearing operation. To prevent axial migration of the foils 22, 24 within the bearing housing, plates 48 are then attached to the outer surface 38 of the bearing housing 28, typically by spot welding or other bonding operation, wherein the plates 48 cover the ends of the keyway 46. Machining the keyway, welding each of the ends 40, 44 respectively of the top foil 22 and the bump foil 24 to the key 42, and welding the plates 48 to the outer surface 38 of the bearing housing 28 are complex, time-consuming manufacturing operations. It would be desirable to develop an air foil bearing requiring less complex manufacture while retaining the desirable bearing and functional characteristics.

SUMMARY OF THE INVENTION

Concordant and consistent with the present invention, an improved air foil bearing assembly is disclosed, comprising a bearing housing having an axially extending bore therein; a shaft arranged within the bore for relative coaxial rotation with respect to the bearing housing, the shaft cooperating with the bearing housing to define an annular gap therebetween; a foil assembly disposed in the annular gap, the foil assembly further comprising at least one foil having at least one laterally extending tab, the tab adapted to be received in and extend axially from the annular gap and adapted to be bent into frictional contact with an outer surface of the bearing housing to militate against axial movement of the foil.

In one embodiment, the inner circumferential surface of the bearing housing includes an axially extending thin slot, and the respective first ends of the top foil and the bump foil include at least one axially extending tab, the tab adapted to be received in and extend axially from the thin slot. The at least on tab is further adapted to be bent into frictional contact with an outer surface of the bearing housing to militate against rotational movement of the top foil and the bump foil.

In another embodiment, an improved air foil bearing assembly is disclosed, comprising a bearing housing having an axially extending bore therein defining an inner circumferential surface; a shaft arranged within the bore for relative coaxial rotation with respect to the bearing housing, the shaft cooperating with the bearing housing to define an annular gap therebetween; an elongate foil having a first substantially flat end portion and a second substantially corrugated end portion, the first end portion adapted to be concentrically wound inside the second end portion within the gap; the elongate foil including at least one axially extending tab adapted to axially extend from the annular gap, the at least one tab further adapted to be secured to an outer surface of the bearing housing.

DESCRIPTION OF THE DRAWINGS

The above, as well as other advantages of the present invention, will become readily apparent to those skilled in the art from the following detailed description of a preferred embodiment when considered in light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 3:
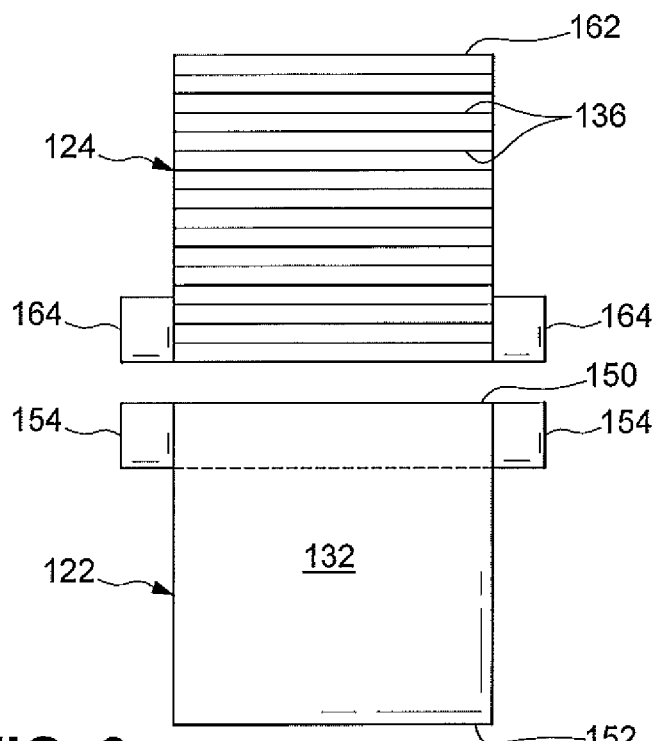
FIG. 3 is a top plan view of foil bearings according to an embodiment of the invention.

FIG. 3 illustrates a top foil 122 and a corrugated or "bump" foil 124 of an air foil bearing. As in the prior art, both the top foil 122 and the bump foil 124 are separately stamped from sheet metal to have a desired thickness. At least an inner surface 132 of the top foil 122 is typically coated with a solid film lubricant to provide low contact friction between a rotating shaft 172 shown in FIG. 4. and the inner surface 132 of the top foil 122. The corrugations 136 may be formed in the bump foil 124 as part of the stamping process, or they may be formed in a second stamping or rolling operation.

The top foil 122 includes a first end 150 and a second end 152. A pair of laterally extending tabs 154 is formed adjacent the first end 150. The tabs 154 are formed so that when the top foil 122 is inserted into an annular gap between a bearing housing 128 and the shaft 172, the tabs 154 extend axially with respect to the shaft 172. The tabs 154 may be integrally formed with the top foil 122, or they may be added at any time during the manufacturing process, as desired. Additionally, the tabs 154 may have a different thickness from the top foil 122, either to add stiffness to the top foil 122 or to improve the bend-ability of the first end 152 of the top foil 122.

Similarly, the bump foil 124 includes a first end 160, a second end 162, and a pair of laterally extending tabs 164 adjacent the first end 160 of the bump foil 124. The tabs 164 are formed so that when the bump foil 124 is inserted into an annular gap between the bearing housing 128 and the shaft 172, the tabs 164 extend axially with respect to the shaft 172. The tabs 164 may be integrally formed with the bump foil 124, or they may be added at any time during the manufacturing process, as desired. Additionally, the tabs 164 may have a different thickness from the bump foil 124, either to add stiffness to the bump foil 124 or to improve the bend-ability of the first end 162 of the bump foil 124.

Figure 4:
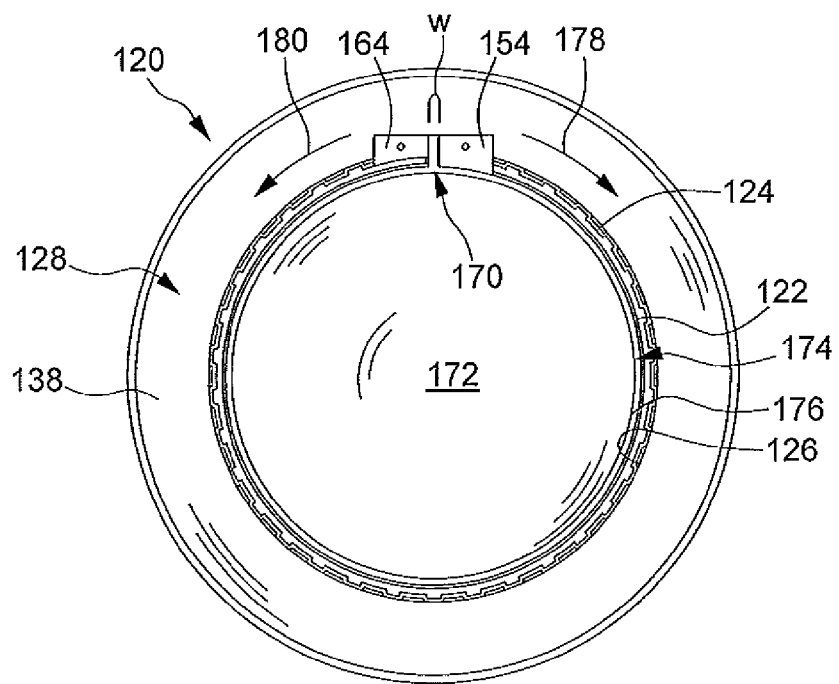
FIG. 4 is an end elevational view of the assembled air foil bearing assembly according to the embodiment shown in FIG. 3.

The top foil 122 and the bump foil 124 are inserted into a bearing assembly 120, shown in FIG. 4. The bearing assembly 120 includes the bearing housing 128 having an axially extending bore defined by an inner circumferential surface 126. An axially extending slot 170 is formed into the inner circumferential surface 126. The bearing housing 128 cooperates with the shaft 172 to define an annular gap 174 between the bearing housing 128 and an outer circumferential surface 176 of the shaft 172. The first end 150 of the top foil 122, including the laterally extending tabs 154, is received within the slot 170, while the second end 152 of the top foil 122 extends circumferentially in a first direction 178, wherein the top foil 122 is in facing relationship with the bearing housing inner circumferential surface 126 and the outer circumferential surface 176 of the shaft 172. The top foil second end 152 may extend part, all, or more than all of the way about the outer circumferential surface 176 of the shaft 172, as desired and as required for proper operation of the bearing assembly 120. In one embodiment, the laterally extending tabs 154 of the top foil 122 extend axially from the slot 170 past an outer end surface 138 of the bearing housing 128. The tabs 154 are bent into frictional contact with the outer end surface 138 of the bearing housing 128. If desired, the tabs 154 may optionally be secured to the outer end surface 138 of the bearing housing 128 by welding or bonding. Insertion of the first end 150, including the tabs 154, into the slot 170 acts to militate against rotational movement of the top foil 122. Additionally, optional welding or bonding of the tabs 154 to the outer end surface 138 of the bearing housing 128 militates against axial movement of the top foil 122, maintaining the position of the top foil 122 between the shaft 172 and the bearing housing 128.

Similarly, the first end 160 of the bump foil 124, including the laterally extending tabs 164, is received within the slot 170, while the second end 162 of the bump foil 124 extends circumferentially in a second direction 180, wherein the bump foil 124 is in facing relationship with the bearing housing inner circumferential surface 126 and the outer circumferential surface 176 of the shaft 172. The bump foil second end 162 may extend part, all, or more than all of the way about the housing inner circumferential surface 126, as desired and as required for proper operation of the bearing assembly 120. In one embodiment, the laterally extending tabs 164 of the bump foil 124 extend axially from the slot 170 past the outer end surface 138 of the bearing housing 128. The tabs 164 are bent into frictional contact with the outer end surface 138 of the bearing housing 128. If desired, the tabs 164 optionally may be secured to the outer end surface 138 of the bearing housing 128 by welding or bonding. Insertion of the first end 160, including the tabs 164, into the slot 170 acts to militate against rotational movement of the bump foil 124. Additionally, optional welding or bonding of the tabs 164 to the outer end surface 138 of the bearing housing 128 militates against rotational movement of the bump foil 124, maintaining the position of the bump foil 124 between the top foil 122 and the bearing housing 128. Typically, the bump foil 124 is installed such that the bump foil second end 162 is located between the top foil 122 and the bearing housing inner circumferential surface 126.

Figure 1:
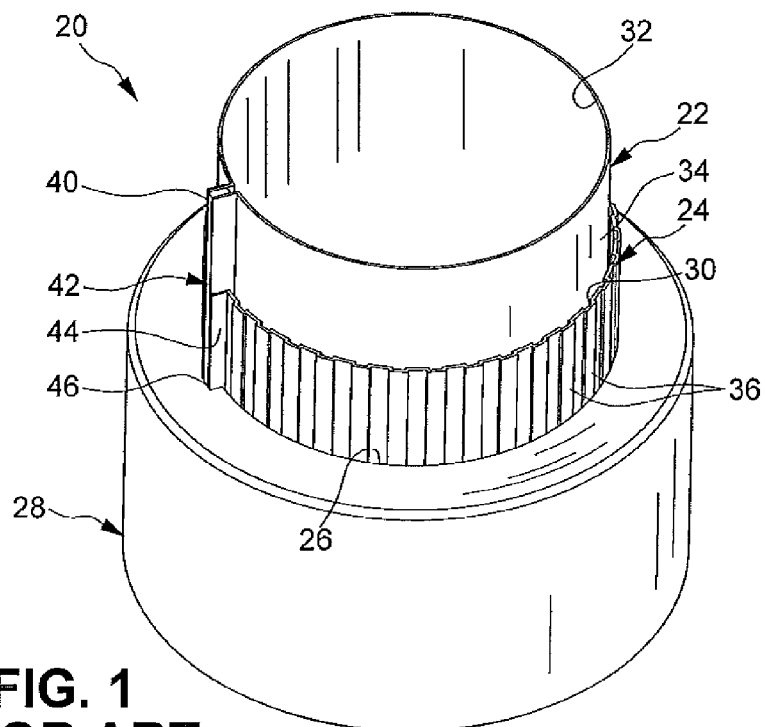
FIG. 1 is a partially exploded perspective view of an air foil bearing assembly as known in the art.
Figure 2:
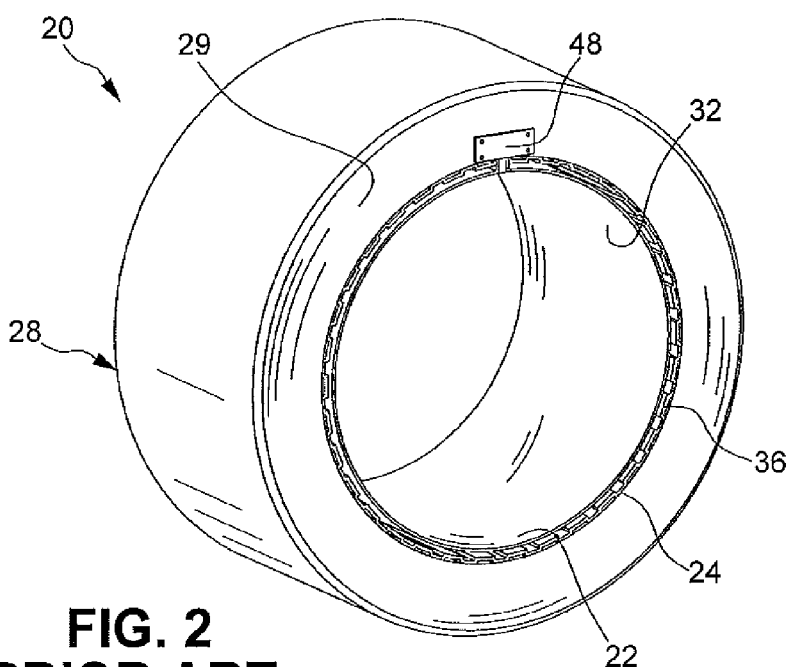
FIG. 2 is an elevational view of the air foil bearing of FIG. 1.

When compared to the bearing assembly 20 of FIG. 1, the bearing assembly 120 of FIGS. 3 and 4 advantageously requires fewer pails, fewer welds, and less time to assemble. In particular, the bearing assembly 120 eliminates the key 42 and the end plates 48. Additionally, less precision is required to form the thin slot 170 instead of a precisely machined keyway 46. Instead, a width w of the slot 170 need only be slightly more than a combined thickness of the top foil 122 and the bump foil 124, although it should be understood that the width w of the slot 170 may be modified as desired for a particular application.

Figure 5:
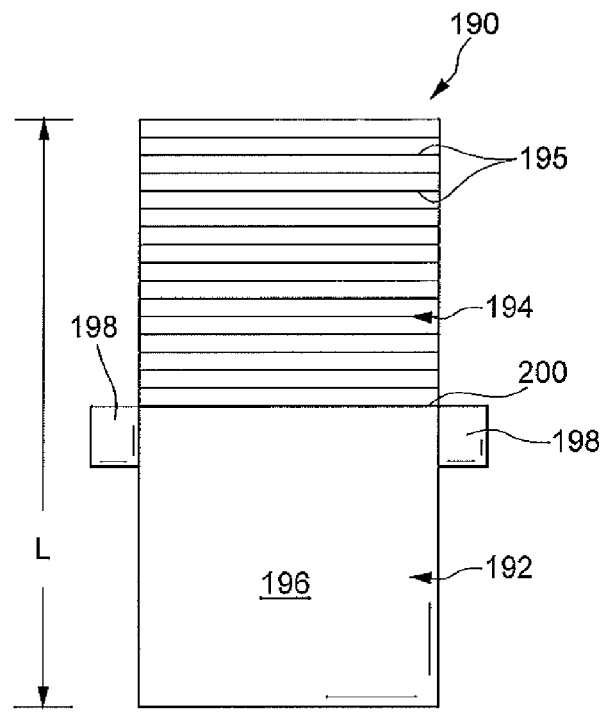
FIG. 5 is a top plan view of a foil bearing according to another embodiment of the invention.

A one-piece foil 190, shown in FIG. 5, may be used to further minimize the assembly complexity of an air foil bearing. The one-piece foil 190 combines features of both a top foil and a bump foil into a single piece. In particular, the one-piece foil 190 may be formed from an elongate sheet, and may be divided along its length L into a substantially flat inner foil portion 192 and a bump portion 194. The relative proportions of the inner foil portion 192 and the bump portion 194 of the one-piece foil 190 may be modified for specific applications and annular gap sizes. As non-limiting examples, the inner foil portion 192 may be substantially equal in length to the bump portion 194, or the inner foil portion 192 may be longer or shorter than the bump portion 194, as desired. Additionally, the inner foil portion 192 and the bump portion 194 may be individually formed and interconnected in a separate manufacturing step, or they may be integrally formed as a single stamping or rolling operation. After the stamping or rolling operation, an inner surface 196 of the inner foil portion 192 may be coated with a solid film lubricant to provide low contact friction between a rotating shaft (not shown) and the inner annular surface 196 of the inner foil portion 192. Similarly, the corrugations 195 of the bump portion 194 of the foil may be created during the stamping or rolling process, or they may be formed in a later manufacturing operation. Additionally, the bump portion 194 may be treated, such as by an annealing process after manufacture of the one-piece foil 190, as desired.

The one-piece foil 190 further includes at least one, and usually a pair, of laterally extending tabs 198 formed along the length L of the one-piece foil. The location of the tabs 198 may be anywhere along the length L, but favorable results have been found when the tabs 198 are located adjacent a midpoint 200 of the length L of the one-piece foil 190. The tabs 198 are formed so that when the one-piece foil 190 is inserted into an annular gap between a bearing housing and a shaft, the tabs 198 extend axially with respect to the shaft. The tabs 198 may be integrally formed with the one-piece foil 190, or they may be added at any time during the manufacturing process, as desired. Additionally, the tabs 198 may have a different thickness from the one-piece foil 190, either to add stiffness to the foil 190 or to improve the assembly process.

Figure 6:
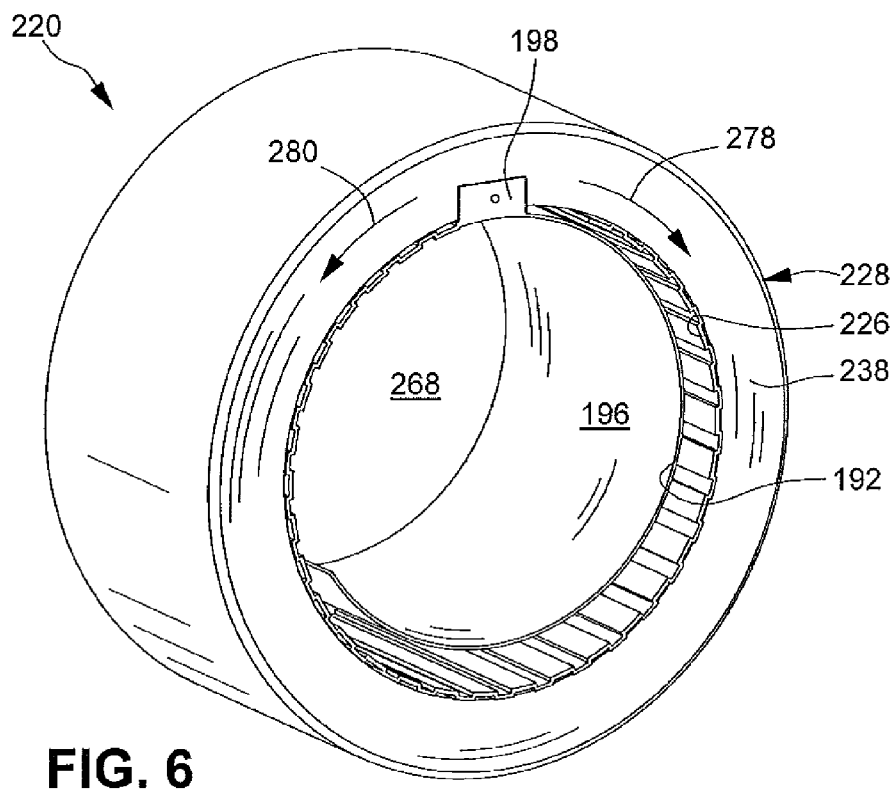
FIG. 6 is a perspective view of the assembled air foil bearing assembly according to the embodiment shown in FIG. 5.

As shown in FIG. 6, the one-piece foil 190 may be inserted within a bearing housing 228 to form a bearing assembly 220. The bearing housing 228 includes an axially extending bore 268 that is defined by an inner circumferential surface 226. However, unlike the bearing assembly 120 of FIG., 4, the inner circumferential surface 226 does not include a slot or a keyway.

The bearing housing 228 cooperates with a shaft (not shown) to define an annular gap between the bearing housing 128 and an outer circumferential surface of the shaft. The one-piece foil 190 is rolled wherein the inner foil portion 192 of the one-piece foil 190 is rolled radially inwardly of the bump portion 194. The bump portion 194 is therefore interposed between the inner foil portion 192 and the inner circumferential surface 226 of the bearing housing 228. Such an arrangement generally requires that the inner foil portion 192 extend circumferentially in a first direction 278, placing the inner foil portion 192 in facing relationship with the shaft. The inner foil portion 192 may extend part, all, or more than all of the way about the outer circumferential surface of the shaft, as desired and as required for proper operation of the bearing assembly 220. Likewise, the bump portion 194 may extend part, all, or more than all of the way about the inner circumferential surface 226 of the bearing housing 228, as desired and as required for proper operation of the bearing assembly 220.

The laterally extending tabs 198 of the one-piece foil 190 extend axially past an outer end surface 238 of the bearing housing 228. The tabs 198 are bent into frictional contact with the outer end surface 238 of the bearing housing 228. If desired, the tabs 198 may be secured to the outer end surface 238 of the bearing housing 228 by welding or bonding, thereby militating against rotational movement of the one-piece foil 190. Additionally, welding or bonding the tabs 198 to the outer end surface 238 of the bearing housing 228 militates against axial movement of the foil 190, maintaining the position of the foil 190 within the gap between the shaft and the bearing housing 228.

A one-piece foil 190 therefore minimizes a complexity of the bearing housing 228. When compared to the bearing assembly 20 of FIG. 1, the bearing assembly 220 of FIG. 6 advantageously requires fewer parts, fewer welds, and less time to assemble. In particular, the bearing assembly 220 eliminates the key 42, the keyway 46, and the end plates 48.

While certain representative embodiments and details have been shown for purposes of illustrating the invention, it will be apparent to those skilled in the art that various changes may be made without departing from the scope of the disclosure, which is further described in the following appended claims.

What is claimed is:

1. A foil bearing assembly, comprising:
   a bearing housing having an axially extending bore formed therein;
   a shaft arranged within the bore for relative coaxial rotation with respect to the bearing housing, the shaft cooperating with the bearing housing to define an annular gap therebetween;
   a top foil disposed in the annular gap, the top foil having at least one laterally extending tab, the at least one laterally extending tab of the top foil extending axially from the annular gap and bent into frictional contact with an outer surface of the bearing housing;

a bump foil disposed in the annular gap, the bump foil having at least one laterally extending tab, the at least one laterally extending tab of the bump foil extending axially from the annular gap and bent into frictional contact with the outer surface of the bearing housing; and wherein the axially extending bore of the bearing housing is defined by an inner circumferential surface of the bearing housing, the inner circumferential surface including an axially extending slot.

2. The foil bearing assembly of claim 1, wherein at least one of the at least one tab of the top foil and the at least one tab of the bump foil is secured by one of welding and bonding to the bearing housing.

3. The foil bearing assembly of claim 1, wherein a first end of the top foil and a first end of the bump foil are secured within the slot.

4. The foil bearing assembly of claim 3, wherein the at least one tab of the top foil is formed adjacent the first end thereof.

5. The foil bearing assembly of claim 4, wherein a second end of the top foil extends within the annular gap in a first direction in facing relationship to an outer circumferential surface of the shaft.

6. The foil bearing assembly of claim 3, wherein the at least one tab of the bump foil is formed adjacent the first end thereof.

7. The foil bearing assembly of claim 6, wherein a second end of the bump foil extends within the annular gap in a second direction in facing relationship to the inner circumferential surface of the bearing housing.

8. A foil bearing assembly, comprising:
a bearing housing having an axially extending bore formed therein;
a shaft arranged within the bore for relative coaxial rotation with respect to the bearing housing, the shaft cooperating with the bearing housing to define an annular gap therebetween;
a top foil having a first end secured to the bearing housing and a second end circumferentially extending in a first direction within the annular gap;
a bump foil having a first end secured to the bearing housing and a second end circumferentially extending in a second direction within the annular gap; and
wherein the axially extending bore of the bearing housing is defined by an inner circumferential surface of the bearing housing, the inner circumferential surface including an axially extending slot, the first end of the top foil and the first end of the bump foil secured within the slot.

9. The foil bearing assembly of claim 8, wherein the first end of the top foil includes at least one laterally extending tab, the at least one tab of the top foil received in and extending axially from the slot.

10. The foil bearing assembly of claim 9, wherein the second end of the top foil is in facing relationship to an outer circumferential surface of the shaft.

11. The foil bearing assembly of claim 9, wherein the at least one tab of the top foil is bent into frictional contact with an outer surface of the bearing housing adjacent the slot.

12. The foil bearing assembly of claim 9, wherein the at least one tab of the top foil is secured to an outer surface of the bearing housing by one of welding and bonding.

13. The foil bearing assembly of claim 8, wherein the first end of the bump foil includes at least one laterally extending tab, the at least one tab of the bump foil received in and extending axially from the slot.

14. The foil bearing assembly of claim 13, wherein the second end of the bump foil is in facing relationship to the inner circumferential surface of the bearing housing.

15. The foil bearing assembly of claim 13, wherein the at least one tab of the bump foil is bent into frictional contact with an outer surface of the bearing housing adjacent the slot.

16. The foil bearing assembly of claim 13, wherein the at least one tab of the bump foil is secured to an outer surface of the bearing housing by one of welding and bonding.

* * * * *